United States Patent [19]
Thompson

[11] 4,124,798
[45] Nov. 7, 1978

[54] OPTICAL VIEWING APPARATUS

[76] Inventor: Kenneth B. Thompson, P.O. Box 4, Leona Valley, Calif. 93550

[21] Appl. No.: 512,627

[22] Filed: Dec. 9, 1965

[51] Int. Cl.² ............................................ G02B 23/12
[52] U.S. Cl. .............................. 250/213 VT; 350/1.2; 350/36; 250/333
[58] Field of Search ..................... 350/29, 36, 49, 160, 350/1-3, 1.2; 250/330, 333, 213 VT

[56] References Cited
U.S. PATENT DOCUMENTS

| | | | |
|---|---|---|---|
| 2,946,255 | 7/1960 | Bolay | 250/333 |
| 2,982,861 | 5/1961 | Menke | 250/213 VT |
| 3,200,250 | 8/1965 | Bouwers | 250/333 |
| 3,464,757 | 9/1969 | Schmidt et al. | 350/1.2 |

Primary Examiner—Verlin R. Pendegrass
Attorney, Agent, or Firm—Fulwider, Patton, Rieber, Lee & Utecht

EXEMPLARY CLAIM

1. Optical apparatus, comprising:
   a concave, substantially spherical reflecting surface;
   an image intensifier along the optical axis of said reflecting surface and having entrance and exit image faces, said exit face being substantially coincident with the focal surface of said reflecting surface;
   an optical objective system for producing an image substantially coincident with the entrance face of said image intensifier; and
   a partially reflecting, partially transmitting beamsplitter interposed between said image intensifier and said reflecting surface.

16 Claims, 6 Drawing Figures

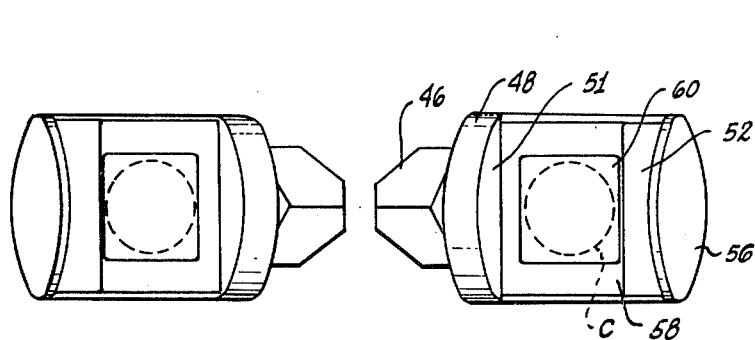
*Fig.3*
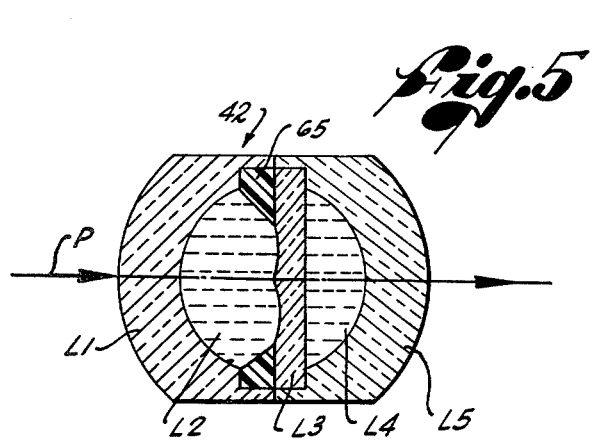
*Fig.5*
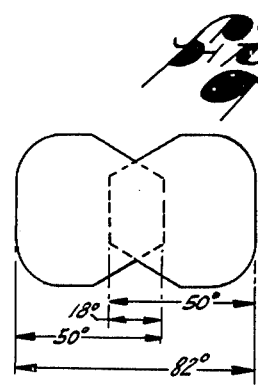
*Fig.4*
*Fig.6*
| ELEMENT | n | v | ENTRANCE FACE RADIUS | EXIT FACE RADIUS | AXIAL THICKNESS |
|---|---|---|---|---|---|
| L1 | 1.720 | 29.2 | 0.5231 | 0.3130 | 0.2101 |
| L2 | 1.480 | 53.0 | 0.3130 | ASPHERICAL | 0.3130 |
| L3 | 1.590 | 31.9 | ASPHERICAL | ∞ | 0.0783 |
| L4 | 1.480 | 53.0 | ∞ | -0.3130 | 0.2347 |
| L5 | 1.720 | 29.2 | -0.3130 | -0.5231 | 0.2101 |
INVENTOR.
KENNETH B. THOMPSON
BY Forrest J. Lilly
ATTORNEY

OPTICAL VIEWING APPARATUS

This invention relates generally to optical viewing devices and, more particularly, to new and improved optical viewing apparatus having an extremely wide field of view and capable of producing a bright image for viewing objects at night or under other low level illumination conditions.

The invention finds particularly advantageous application as unit power, night viewing binoculars and, for this reason, the invention is described with particular emphasis upon this application. However, it is to be understood that the specific embodiments set forth in the ensuing description are by way of example only and are not to be considered as restricting the invention.

Night viewing, goggle-type binoculars, i.e., lightweight, compact binoculars capable of providing an image with amplified light intensity, would be particularly useful in police, military, and sporting applications, as well as for any other application where it is desirable to be able to see in the dark. Unfortunately, however, the design of such binoculars poses practical problems which were not satisfactorily resolved prior to the present invention.

If no limitations are placed on compactness and weight, then wide field, unit power, high aperture systems can be provided using state of the art optical configurations. However, for night viewing binoculars which are to be attached to the observer's head, compactness and weight become extremely important considerations, and the optical design problems are magnified many times over.

If the image is erected by means of a lens system, the designer has the choice of utilizing a relatively simple lens combination requiring a long light path, or a complex lens combination permitting a short light path. However, both of these approaches are undesirable for goggle-type binoculars to be worn upon the head of an observer, since the simple optical arrangement is not at all compact and the more complicated arrangements are too heavy for practical mounting upon the head.

If prisms are used in binoculars to erect the image formed by the objective optics, there is the disadvantage that four reflections are required. Where wide angle and high aperture requirements exist for the transmitted beam of light, it is not practical to pass the beam through such a succession of four reflections even if the prisms are fabricated of very dense glass.

A further difficulty encountered in the design of wide angle, night viewing binoculars resides in the excessive overall length of the wide angle eyepieces. This ordinarily has the effect of lengthening the back-to-front dimension of the system or, if one reflection of the erecting system is placed behind the eyepiece, the excessive back-to-front length is merely shifted to excessive lateral spread. Moreover, in the latter case, there is a loss of eye relief due to the interposition of the reflector between the eyepiece and the eye.

Another undesirable characteristic of wide angle binocular systems is the existence of curvature of field and astigmatism in amounts that render image points as either out of focus or elongated blurs towards the edges of the field.

Hence, those concerned with the development of wide angle optical viewing devices have long recognized the need for new and improved apparatus which overcomes the above and other disadvantages of the prior art. The present invention fulfills this need.

Accordingly, one object of the present invention is the provision of a new and improved optical viewing apparatus having a wide field of view, low distortion, and wherein curvature of field and aberrations are minimal.

Another object is to provide a new and improved wide angle viewing device having relatively large light gathering capability.

A further object of this invention is the provision of a new and improved wide angle optical viewing device which is relatively compact and lightweight.

Still another object is to provide a new and improved wide angle optical viewing device which is relatively simple to construct.

Yet another object of the present invention is the provision of a new and improved wide angle optical viewing device capable of light intensification for enhanced viewing under low level illumination conditions.

A still further object is to provide new and improved night viewing binoculars.

Another object of this invention is to provide new and improved wide angle, night viewing binoculars characterized by compactness and low mass.

A still further object of the present invention is the provision of new and improved wide angle, unit power, night viewing binoculars characterized by large light gathering capability, high image resolution, compactness, low mass, and relatively simple construction.

The above and other objects and advantages of this invention will become apparent from the following description, when taken in conjunction with the accompanying drawings of illustrative embodiments thereof, and wherein:

FIG. 3 is an elevational view from the observer's end of the optical system of FIG. 2;

FIG. 4 illustrates the appearance of the binocular field for the optical system of FIGS. 2 and 3;

FIG. 5 is an enlarged, sectional view illustrating the structure of one embodiment of an appropriate wide angle objective lens for the binoculars of FIGS. 2 and 3; and FIG. 6 is a table of suitable values for the design parameters of the lens illustrated in FIG. 5.

Figure 1:
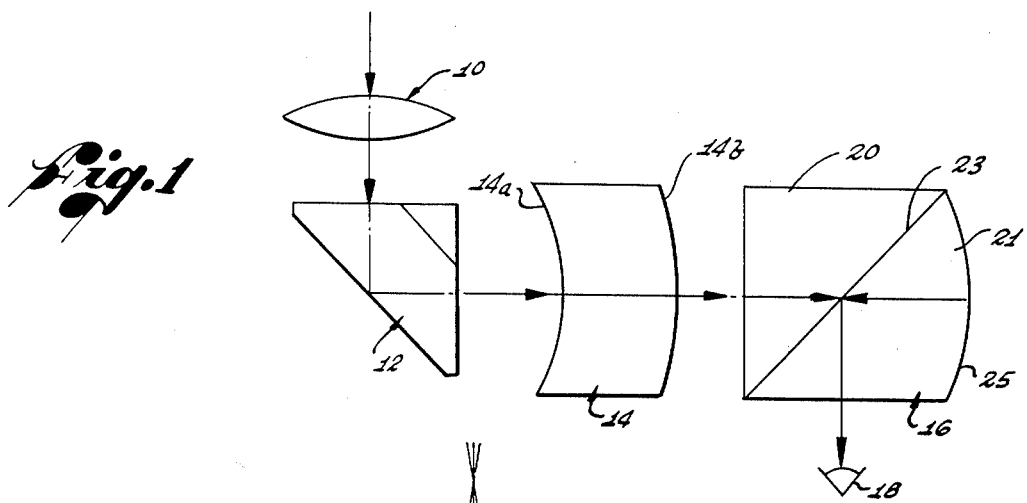
FIG. 1 is an optical schematic diagram of one embodiment of an optical viewing apparatus in accordance with the present invention.

Referring now to the drawings, and particularly to FIG. 1 thereof, there is shown a generalized optical viewing system in accordance with the present invention. Basically, the optical arrangement of FIG. 1 includes a wide angle, positive objective lens 10, an Amici roof prism 12, an image intensifier 14, and an eyepiece unit in the form of a beamsplitter-combiner cube 16.

The objective lens 10 may, in practice, consist of a single positive lens or any combination of lenses making up a positive lens system, the output image formed by the objective lens being a real image which is inverted and laterally reversed.

The problem of erecting the image with four reflections in a relatively compact, low mass system, to correct for the original image inversion and reversion, has been solved in the arrangement of FIG. 1 by dividing the restoring functions between the objective and eyepiece units, and integrating the two reflections assigned to the eyepiece unit into the power elements of the eyepiece itself. Hence, the beamsplitter-combiner which constitutes the eyepiece unit serves both to erect the image and to provide optical power.

The beam of light from the wide angle objective lens 10 undergoes two image erecting reflections in passing through the Amici roof prism 12. The imaging beam then impinges upon the entrance face 14a of the image intensifier 14.

The image intensifier 14 is a miniature unit, typically measuring approximately 20 millimeters in front-to-back length and 30 millimeters in diameter. Such units typically incorporate a photocathode input surface of antimony, cesium or the like, a phosphor output surface of zinc sulfide or the like, a plurality of electron transparent, secondary emission dynodes, e.g., of potassium chloride on gold or the like, between the input and output surfaces, and an electron collimator in the form of a focusing coil coaxial with the dynodes and input and output surfaces of the image intensifier. Light impinging upon the photocathode input surface 14a causes electrons to be emitted and accelerated through dynode stages at successively higher voltage levels, to amplify the electron current in photomultiplier fashion and thereby produce a bright output image on the phosphor face 14b. Such units typically have an overall brightness gain of 10,000 with an output image resolution of 10 lines per millimeter. In this connection, it is to be understood that the details of internal design and method of amplification of the image intensifier 14 bear no relation to the present inventive concept, and such wafer intensifier designs are considered to be within the province of one having ordinary skill in the art.

The entrance face 14a of the image intensifier 14 coincides with the focal surface of the preceding optics including the wide angle lens 10 and Amici prism 12. In this regard, the entrance face 14a of the image intensifier is curved to match the field curvature of the focal surface. Since the field curvature radius is the same for the objective system focal surface and the entrance face of the image intensifier 14, the precise coincidence of these two surfaces insures that all image rays are uniformly in focus upon the surface 14a over the entire field of view. Hence, compensation is made for the curvature of field of the objective optics.

The image upon the intensifier entrance face 14a is amplified and provided as a bright output image upon the exit face 14b of the image intensifier. The latter output image is then viewed by an observer at 18 through the beamsplitter-combiner eyepiece unit 16.

The beamsplitter-combiner cube 16 is formed by a pair of prisms 20, 21 cemented together to form a common interface 23. A partial reflecting-transmitting film is evaporated onto one of the prism faces at 23 prior to cementing the two prisms together. The beamsplitter function is thus performed at the interface 23. The outer surface 25 of the prism 21 provides a substantially spherical, concave reflecting surface directed towards the beamsplitting interface 23.

While the beamsplitter interface 23 is shown inclined at an angle of substantially 45° to the common optical axis of the concave reflecting surface 25 and the image intensifier 14, it is to be understood that the beamsplitter may be inclined at angles other than 45° to the optical axis without departing from the spirit and scope of the present invention. Moreover, while the reflecting surface 25 has been described as substantially spherical, this is applied only in the general sense and is deemed to include aspherical skill-of-the-art variations from an ideal spherical surface in order to optimize optical performance.

Light emitted from the exit face 14b of the image intensifier 14 enters the beamsplitter-combiner cube 16, passes through the partially transparent interface 23 to the concave mirror 25, is reflected by the concave mirror 25 back to the interface 23, and is reflected from the latter to the eye of the observer at 18.

In accordance with the present invention, the output face 14b of the image intensifier 14 coincides with the principal focal surface of the concave mirror 25. Moreover, since the field curvature radius of a spherical concave mirror is classically equal to one-half of the radius of curvature of the concave mirror, the curvature of the image intensifier output face 14b should closely approximate this value. The coincidence of the concave mirror focal surface at the exit face 14b insures that all image rays reflected from the concave mirror are uniformly in focus over the entire field of view, when the image is observed by light reflected from the beamsplitter interface 23 to the eye of the observer at 18.

The aforedescribed elimination of curvature of field is usually extremely difficult and expensive to achieve in conventional wide angle viewing systems. Moreover, the concave mirror 25 has virtually no chromatic aberration of its own and is essentially free from coma, astigmatism, spherical aberration and distortion.

In order to fully utilize the very favorable, low aberration characteristics of the concave mirror 25, the aberration residuals of the preceding optics should preferably be held to relatively low levels. Any spherical aberration incurred by virtue of the plano entrance face of the prism 20 can be minimized by asphering the concave reflecting surface 25 or by making the entrance face to the prism 20 concentric with the output face 14b of the image intensifier 14.

The use of an optical medium which is denser than air on each side of the beamsplitter interface 23 constricts the cone of principal rays into a narrow angle, and thereby enables the optical system to provide the eye of the observer at 18 with a wider field of view. The use of a solid beamsplitter cube instead of a semi-transparent beamsplitter substrate also eliminates the requirement of making the beamsplitter substrate thin in order to minimize parallel plate aberrations occurring from a divergent beam passing through such a plate at other than normal incidence.

Figure 2:
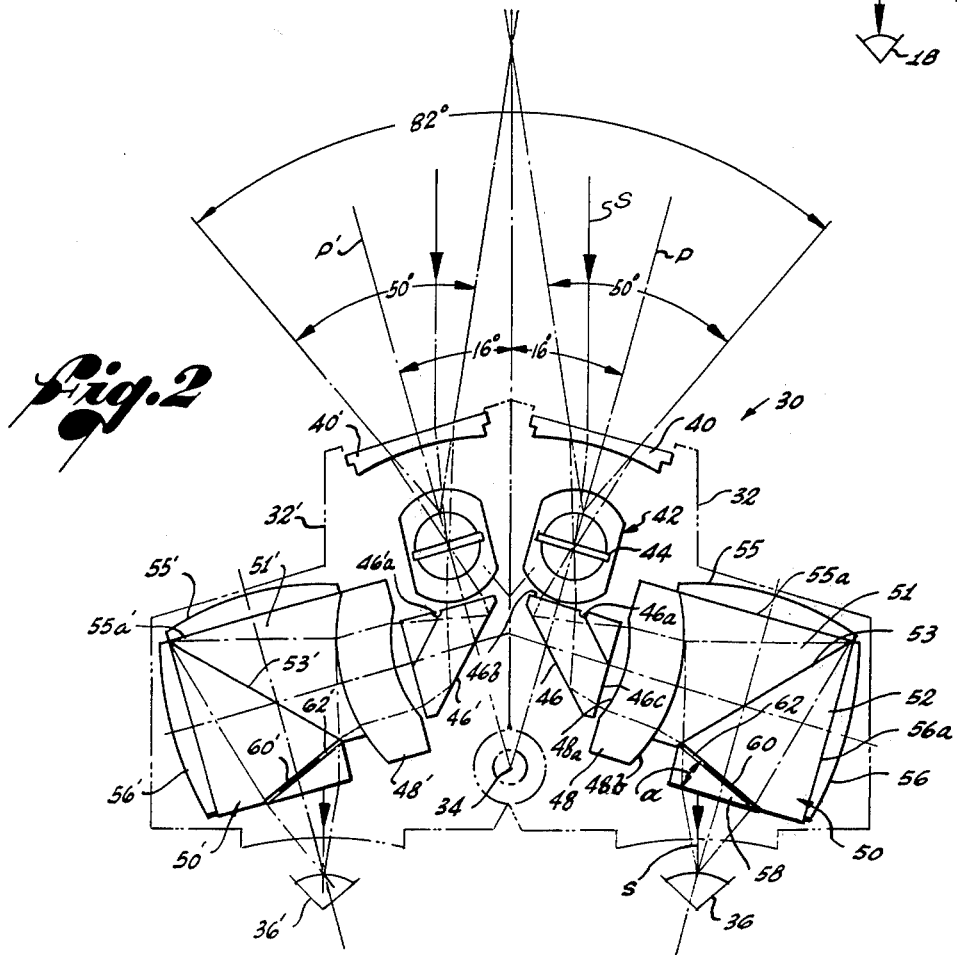
FIG. 2 is a plan view of an optical system for night viewing binoculars in accordance with the present invention.

Referring now more particularly to FIGS. 2-4 of the drawings, there is shown a binocular system embodying the present invention. Since the binocular system is symmetrical about a central axis A, only the structural components of the right half of the binoculars will be described in detail, and it is to be understood that the description applies equally well to the left half of the system which is structurally identical to the right half of the system.

Each half of the binoculars 30 in FIG. 2 is contained within appropriate housings 32, 32', respectively, which are hinged at 34 so that the left and right halves of the binoculars can be pivoted relative to each other about an axis perpendicular to the axis of symmetry A of the system.

The observer's eyes are normally located at 36 and 36' for the right and left halves, respectively, of the binoculars 30.

In a presently preferred embodiment of the binoculars 30, the optical axes P and P' of each optical system are toed outward by approximately 16° from the axis of symmetry A of the binoculars. With each ocular covering a field of approximately 50°, the latter toeing out of each optical system by 16° extends the total binocular field to 82°. The field in the central 18° represents the overlapping of the left and right ocular fields. This central overlapping field is the only region where the observer has the benefit of stereoscopic vision and is indicated by the hexagonal outline of the field pattern shown in FIG. 4.

Referring now more specifically to the right half of the binoculars 30 in FIG. 2, the components of the optical system in the order in which they are encountered by light entering the system are as follows: a weak-power negative lens 40 serving the function of a field compressor; a monocentric ball-sphere objective lens 42 with a typical aperture of F/1.25 and having a zero-power aspheric corrector plate 44 and an aperture stop at the center of the lens; an Amici roof prism 46 of glass having a relatively high index of refraction, e.g., preferably 1.88 or higher, to provide maximum field angle; an image intensifier 48 having entrance and exit faces 48a and 48b, respectively; a beamsplitter-combiner cube 50 including a pair of prism components 51, 52 cemented together and having a partial reflecting-transmitting film at their interface 53, and further including a pair of second-surface concave mirrors 55, 56 having their plano entrance-exit faces 55a, 56a, respectively, cemented to prisms 51 and 52, respectively; and a prism wafer 58 cemented to prism 52 with a mask 60 in between leaving a clear circular viewing area C (see FIG. 3).

Light from a distant, straight-ahead object (not shown) enters the optical system for the right half of the binoculars 30 in the direction of the arrow S in FIG. 2. The light rays pass through the field compressor lens 40, monocentric objective lens 42 and Amici prism 46 to impinge upon the entrance face 48a of the image intensifier 48. In this connection, any suitable focusing means may be provided to shift the lens 40, lens 42, or both along the optical axis P to enable precise focusing of the image formed by the objective system optics upon the image intensifier entrance face 48a regardless of the object distance involved.

The monocentric ball-sphere lens 42 normally has field curvature with a radius equal to its focal length. However, the addition of the field compressor lens 40 and the Amici prism 46 has the effect of flattening the field to a small extent. In the system of FIG. 2, the field compressor lens 40 is located at the first focal point of the ball-sphere lens 42, so that the power of the compressor lens does not alter the EFL (effective focal length) of the ball-sphere lens. However, the compressor lens 40 does increase the BFL (back focal length) of the ball-sphere lens 42, the latter being desirable in order to insure that the real image formed by the objective lens system falls outside of the Amici prism upon the image intensifier entrance face 48a.

The curvature of the entrance face 48a of the image intensifier substantially coincides with the curvature of the focal surface of the real image formed by all of the optics preceding the entrance face. The criterion for the shape of the entrance face 48a in FIG. 2 is thus the same as for the shape of the entrance face 14a in the optical system of FIG. 1.

The image intensifier 48 may be any type of high gain, high resolution, miniature image intensifier unit of the non-inverting type, and the specific design of the internal amplification means embodied by the intensifier unit between the entrance face 48a and the exit face 48b does not fall within the scope of the present invention. Electrical power for both image intensifier units of the binoculars 30 can be supplied by portable, miniature power supply units (not shown) which are well known in the art.

The image upon the entrance face 48a of the image intensifier 48 is amplified and transmitted to the exit face 48b. The exit face 48b is curved to match the curvature of the principal focal surface common to the pair of concave mirrors 55, 56 of the beamsplitter-combiner cube 50, for the same reasons set forth in connection with the relationship between the curvature of the image intensifier exit face 14b and the concave mirror 25 in the optical system of FIG. 1.

As stated previously, the monocentric objective lens 42 has a curved field with a field curvature radius approximately equal to its focal length. However, because of the field flattening properties of the field compressor lens 40 and the Amici prism 46, the radius of curvature of the intensifier entrance face 48a is slightly longer than the focal length of the objective lens 42. Now, the radius of curvature of the focal surface of the concave mirrors 55, 56 is equal to the mirror focal length, and since the latter must be equal to the focal length of the objective lens 42 for unit power magnification, it follows that the intensifier exit face 48b has a radius of curvature that will usually be slightly less than the radius of curvature of the entrance face 48a, in order to provide the ideal focus for all parts of the field and eliminate field curvature in the final image observed by the eye at 36. In the event, however, that manufacturing conditions dictate equal radii of curvature for the entrance and exit faces 48a, 48b, respectively, of the image intensifier, the objective system can readily be modified to provide compensation for the slight residual field curvature problem presented. Moreover, the depth of focus inherent in the concave mirrors 55, 56 will usually be sufficient to make such residual field curvature compensation unnecessary.

In order to prevent stray reflections which may strike the entrance face of the Amici prism 46 internally and be totally reflected to the area of the primary image formed on the image intensifier entrance face 48a, a groove 46a is provided across the entrance face 46b of the prism and the portion of the prism entrance face 46b between the groove 46a and the prism exit face 46c is coated with an opaque material.

The light emitted from the image intensifier exit face 48b next encounters the beamsplitter-combiner cube 50 which constitutes the eyepiece unit of the optical system. In the embodiment of the invention shown in FIG. 2, the intensifier exit face 48b is in contact with the entrance face of the prism 51, the latter entrance face being concentric in curvature with the intensifier exit face. In this connection, the image intensifier 48 and prism 51 can be air spaced to enable focusing by the eyepiece unit. However, if the focusing feature is omitted, the intensifier exit face 48b may be cemented to the entrance face of the prism 51 as shown in FIG. 2.

By curving the entrance face of the prism 51 so that it is concentric with the intensifier exit face 48b, the principal rays from the exit face 48b enter the prism 51 unrefracted. Hence, the concave mirrors 55 and 56 have shorter radii of curvature and shorter focal lengths. Consequently, the prisms 51 and 52 are shorter in length and a much wider field of view for the eyepiece unit is provided.

After the light from the image intensifier exit face 48b enters the prism 51 of the beamsplitter-combiner cube 50, it impinges upon the partially transmitting-reflecting interface 53 between the prisms 51 and 52. At the interface 53, half of the impinging light energy is transmitted to the concave mirror 56, while the other half of the light energy is reflected to the concave mirror 55. Both of the concave mirrors 55, 56 return the impinging light toward its origin, thus encountering the beamsplitting interface 53 a second time. Again, half of the incident light is reflected and half is transmitted. Thus, the light reflected from the mirror 56 loses half of its energy by transmission in the direction of the image intensifier 48, while the other half is reflected in the direction of the eye at 36. The light returned by the mirror 55 loses half of its energy by reflection at interface 53 in the direction of the image intensifier, while the other half is transmitted through the interface in the direction of the eye at 36. Neglecting absorption, the total light energy loss from the double encounter with the partial transmitting-reflecting interface 53 is 50% or one T-stop.

The recombined beams of light from the concave mirrors 55 and 56 next encounter a thin, parallel air gap 62 between the bottom of the prism 52 and the entrance face of the prism wafer 58. The purpose of the air gap 62 is to reject by total reflection any light which would be directly transmitted from the image intensifier exit face 48b to the region of the observer's eye at 36. Such rejection takes place when the angle of incidence for the stray light at the air gap 62 is greater than the critical angle. Assuming, for example, that the index of refraction of the prism 52 is 1.59, the critical angle would be approximately 39°. Under these conditions, the prism wafer 58 in the system of FIG. 2 should have an angle $\alpha$ of approximately 23° to provide the necessary discrimination between stray light and desired light.

The thin air gap 62 can be provided by cementing an opaque mask of plastic or the like between the prism 52 and the prism wafer 58. Alternatively, the mask can be provided in the form of an evaporated coating upon either of the parts 52, 58. The mask 60 has a circular, central opening C (see FIG. 3) which is clear of cement and is the aperture through which the image is viewed by the eye at 36.

The beam of light that emerges from the prism wafer 58 has its optical axis P inclined by the same angle relative to the axis of symmetry A as the entrance axis P, since the system is unit-power. If the focal length of the mirrors 55, 56 is selected to provide magnification other than unity, the parallelism between entrance and exit axes is no longer preserved.

With the optical system of FIGS. 2 and 3, there is no defined exit pupil, since the eye sees the image of the diffuse intensifier exit face 48b rather than the image of an aperture stop. However, the effective exit pupil is of sufficient size in the binoculars 30 of FIG. 2 that the eye at 36 does not suffer any substantial vignetting when the eye is rolled for foveal vision over any part of the instrument field.

The field stop for the optical system of FIG. 2 may be placed in coincidence with either the entrance face 48a or the exit face 48b of the image intensifier 48. This field stop may take the form of an evaporated metallic film upon either of the image intensifier faces. The field stops in the left and right hand optical systems of the binoculars 30 should be left open at the ends where they overlap in the composite binocular view, as best observed in FIG. 4. The omission of the field outline in this manner enables the tips of the Amici prisms to act as out-of-focus stops which tend to wash out the hard outlines that would otherwise delineate the overlapping portions of the left and right hand fields.

Interpupillary adjustment is accomplished in the system of FIG. 2 by pivoting the left and right hand optical systems about the hinge post at 34. This also changes the net field angle observed as well as the size of the stereoscopic field overlap region between the left and right hand optical systems. Alternatively, interpupillary adjustment can be accomplished by providing a lateral slide mechanism (not shown) for each of the optical systems comprising the binoculars 30.

Referring now more particularly to FIG. 5, there is shown an enlarged cross-sectional view of the wide angle-ball-sphere objective lens 42 used in the optical system of FIG. 2. The lens 42 is a monocentric unit, i.e., all power lens elements have a common center of curvature. The exterior lens elements L1 and L5 are fabricated of relatively low v-number material, while the center lens elements L2 and L4 are made from relatively high v-number materials. On the other hand, the refractive index "n" of the outer lens elements L1 and L5 must be higher than the refractive index of the center elements L2 and L4. For example, the outer lens elements can be made from molded polystyrene having a v-number of 31 and an index of refraction of 1.59, while the inner lens elements could be a liquid, such as "white oil", having a v-number of 53 and refractive index of 1.48.

The use of a liquid for the optical medium comprising the center lens elements L2 and L4 has the advantage of enabling an aspheric corrector plate L3 to be immersed in the liquid at the center of the ball for the purpose of eliminating zonal or secondary spherical aberration. If the corrector plate L3, which is essentially a zero-power element, is made from polystyrene, the difference in index of refraction between the liquid and the corrector plate is only 0.11, and this small variance is beneficial in that it reduces the precision required in producing the aspheric surface of the corrector plate L3.

An opaque plastic or metal aperture stop 65 is also contained within the ball-sphere lens 42 and is positioned ahead of the aspheric corrector plate L3 along the optical axis P of the lens.

FIG. 6 indicates the appropriate design parameters for one embodiment of a wide angle lens 42 of the type shown in FIG. 5 and suitable for use with the system of the present invention. Dense flint glass is used for the outer lens elements L1, L5. "White oil" is used for the inner lens elements L2, L4, and the aspheric corrector plate L3 is fabricated of polystyrene plastic. The resultant lens has an effective focal length of 1.000 inches, a back focal length of 0.4809 inches, and an aperture ratio of F/1.256.

The present invention satisfies a long existing need in the art for unit power, night viewing binoculars having a wide field of view, large light gathering capability, and high image resolution, which are substantially free from aberrations and curvature of field, and which are both compact and lightweight. In addition, the distribution of volume and mass for the apparatus of the present invention provides a degree of balance which is very well suited for a head mounted instrument.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. Optical apparatus, comprising:
   a concave, substantially spherical reflecting surface;
   an image intensifier along the optical axis of said reflecting surface and having entrance and exit image faces, said exit face being substantially coincident with the focal surface of said reflecting surface;
   an optical objective system for producing an image substantially coincident with the entrance face of said image intensifier; and
   a partially reflecting, partially transmitting beamsplitter interposed between said image intensifier and said reflecting surface.

2. Optical apparatus as set forth in claim 1, including a second concave reflecting surface matching said first aforementioned concave surface, said second concave surface being positioned relative to said beamsplitter and said first concave reflecting surface to enable superposition of the images of said image intensifier exit face formed by both of said reflecting surfaces.

3. Optical viewing apparatus, comprising:
   a concave, substantially spherical mirror;
   an image intensifier along the optical axis of said mirror, said image intensifier having curved entrance and exit image faces, said exit face being substantially coincident with the principal focal surface of said mirror;
   an objective lens system for producing a real image substantially coincident with the curved entrance face of said image intensifier;
   dual reflection, erecting prism means between said lens system and said image intensifier; and
   a partially reflecting, partially transmitting beamsplitter interposed between said image intensifier and said concave mirror.

4. Optical apparatus as set forth in claim 3, including a second concave mirror matching said first aforementioned concave mirror, said second concave mirror being positioned relative to said beamsplitter and said first concave mirror to enable superposition of the images of said image intensifier exit face formed by both of said mirrors.

5. Optical viewing apparatus as set forth in claim 4, wherein both of said concave mirrors and said beamsplitter are embodied within a solid, beamsplitter-combiner cube.

6. Optical viewing apparatus, comprising:
   an eyepiece unit including a pair of substantially identical concave mirrors having mutually perpendicular optical axes intersecting at a partially reflecting, partially transmitting beamsplitter interposed between said mirrors, said beamsplitter dividing input light energy to said eyepiece unit between said pair of mirrors and enabling superposition of the output images produced by said mirrors;
   an image intensifier having entrance and exit image faces, said exit face being substantially coincident with the common principal focal surface of both of said concave mirrors;
   a wide angle objective lens system for producing a real image substantially coincident with the entrance face of said image intensifier; and
   dual reflection, erecting prism means between said lens system and said entrance face of said image intensifier.

7. Optical viewing apparatus as set forth in claim 6, wherein said prism means is an Amici roof prism having an entrance face directed toward said objective lens system and an exit face directed toward said entrance face of said image intensifier.

8. Optical viewing apparatus as set forth in claim 7, wherein said Amici prism includes a groove extending across said entrance face of said prism, and said entrance face is further provided with an opaque coating between said groove and said exit face of said prism.

9. Optical viewing apparatus as set forth in claim 6, including a field compressor lens positioned ahead of said objective lens system at the first focal point of said lens system.

10. Optical viewing apparatus as set forth in claim 6, wherein the common focal length of said concave mirrors and the focal length of said objective lens are substantially equal to provide unit power magnification.

11. Optical viewing apparatus as set forth in claim 6, wherein said eyepiece unit including said pair of concave mirrors and said beamsplitter is formed as an integral, solid beamsplitter-combiner cube.

12. Optical viewing apparatus as set forth in claim 11, wherein said entrance face of said image intensifier is curved to match the curvature of the focal surface of the real image formed at said entrance face by all of the optics preceding said entrance face, and said exit face of said image intensifier is curved to match the field curvature of the common principal focal surface of said concave mirrors.

13. Optical viewing apparatus as set forth in claim 12, wherein said beamsplitter-combiner cube includes a curved entrance face concentric with the curved exit face of said image intensifier.

14. Optical viewing apparatus as set forth in claim 12, including total reflection means adjacent said beamsplitter-combiner cube for preventing direct transmission of light from said exit face of said image intensifier as output light from said beamsplitter-combiner cube.

15. Optical viewing apparatus as set forth in claim 14, wherein said total reflection means includes a prism wafer air spaced from the output face of said beamsplitter-combiner cube.

16. Optical viewing apparatus as set forth in claim 12, wherein said wide angle objective lens system includes a monocentric objective lens.

* * * * *